(12) United States Patent
Kunze et al.

(10) Patent No.: US 10,641,642 B2
(45) Date of Patent: May 5, 2020

(54) METHOD FOR OPERATING A CORIOLIS MASS FLOWMETER AND CORIOLIS MASS FLOWMETER

(71) Applicant: KROHNE Messtechnik GmbH, Duisburg (DE)

(72) Inventors: Johannes Kunze, Bochum (DE); Ralf Storm, Essen (DE)

(73) Assignee: KROHNE MESSTECHNIK GMBH, Duisburg (DE)

( * ) Notice: Subject to any disclaimer, the term of this patent is extended or adjusted under 35 U.S.C. 154(b) by 93 days.

(21) Appl. No.: 15/817,446

(22) Filed: Nov. 20, 2017

(65) Prior Publication Data
US 2018/0143064 A1    May 24, 2018

(30) Foreign Application Priority Data
Nov. 18, 2016  (DE) .................. 10 2016 122 241

(51) Int. Cl.
*G01F 1/84*   (2006.01)
*G01F 25/00*  (2006.01)
*G01D 7/00*   (2006.01)

(52) U.S. Cl.
CPC ............ *G01F 25/0007* (2013.01); *G01F 1/84* (2013.01); *G01F 1/8436* (2013.01); *G01F 1/8468* (2013.01); *G01F 25/00* (2013.01); *G01D 7/00* (2013.01); *G01F 1/849* (2013.01)

(58) Field of Classification Search
CPC ........ G01F 1/84; G01F 1/8468; G01F 1/8472; G01F 1/8481; G01F 1/849; G01F 25/00; G01F 25/0007; G01F 25/003
See application file for complete search history.

(56) References Cited

U.S. PATENT DOCUMENTS

| | | | |
|---|---|---|---|
| 5,044,207 A * | 9/1991 | Atkinson | G01F 1/8413 73/861.357 |
| 5,734,112 A | 3/1998 | Bose et al. | |
| 6,092,409 A | 7/2000 | Patten et al. | |
| 7,640,813 B2 | 1/2010 | Storm | |
| 7,953,568 B2 | 5/2011 | Hays et al. | |
| 8,104,361 B2 | 1/2012 | Kolahi | |
| 8,135,552 B2 | 3/2012 | Hays et al. | |

(Continued)

*Primary Examiner* — Herbert K Roberts
(74) *Attorney, Agent, or Firm* — David S. Safran; Roberts Calderon Safran & Cole, P.C.

(57) ABSTRACT

A method for operating a Coriolis mass flowmeter having at least one measuring tube, at least one oscillation generator, at least two oscillation sensors, and at least one control and evaluation unit, the oscillation generator and the oscillation sensors being arranged on the measuring tube, wherein the measuring tube has a medium flowing through it, wherein the oscillation generator puts the measuring tube into a harmonic oscillation with the excitation frequency $f_0$ and the excitation amplitude $A_0$, wherein the first and the second oscillation sensors detect the oscillation of the measuring tube and wherein the first oscillation sensor forwards the oscillation to the control and evaluation unit as first measuring signal and wherein the second oscillation sensor forwards the oscillation to the control and evaluation unit as second measuring signal, and wherein at least one comparison measurement signal is determined from the first measuring signal and/or the second measuring signal.

10 Claims, 3 Drawing Sheets

(56) References Cited

U.S. PATENT DOCUMENTS

| | | | |
|---|---|---|---|
| 8,950,274 B2 | 2/2015 | Scherrer | |
| 9,689,736 B2 | 6/2017 | Plaziak et al. | |
| 2006/0235629 A1* | 10/2006 | Walker | G01F 1/74 702/45 |
| 2008/0027660 A1* | 1/2008 | Keese | G01F 1/32 702/45 |
| 2008/0053240 A1* | 3/2008 | Henry | G01F 1/74 73/861.04 |
| 2010/0299089 A1* | 11/2010 | Stack | G01F 1/74 702/48 |
| 2011/0185822 A1* | 8/2011 | Hays | G01F 1/8413 73/861.356 |
| 2013/0228003 A1* | 9/2013 | Bierweiler | G01F 1/8436 73/1.16 |
| 2014/0129156 A1* | 5/2014 | Henry | G01F 1/8404 702/48 |
| 2016/0138960 A1 | 5/2016 | Horst | |

* cited by examiner

METHOD FOR OPERATING A CORIOLIS MASS FLOWMETER AND CORIOLIS MASS FLOWMETER

BACKGROUND OF THE INVENTION

Field of the Invention

The mass flow of the medium flowing through the measuring tube 3 is determined 13 from the measured amplitude and the phase as well as from comparison with the second measuring signal. In addition, the power $P_0$ of the comparison measurement signal 10 is determined 14 from the amplitude at the excitation frequency $f_0$. The THD+N value of the comparison measurement signal 10 is determined in a next step 15 from the total power $P_{ges}$ and the power $P_0$ of the comparison measurement signal 10 at the excitation frequency $f_0$. The THD+N value is compared to a stored expected value, which has been determined earlier, in a next step 16, and the deviation between the THD+N value and the expected value is determined in step 16 by subtraction. If the deviation exceeds an upper limit value, an alert is issued in a next step 17.

Furthermore, the invention is based on a Coriolis mass flowmeter having at least one measuring tube, at least one oscillation generator, at least two oscillation sensors and at least one control and evaluation unit, wherein the oscillation generator and the oscillation sensors are arranged on the measuring tube, wherein the oscillation generator is designed such that it, during operating, puts the measuring tube into a harmonic oscillation with the excitation frequency $f_0$ and the excitation amplitude $A_0$, wherein the first and the second oscillation sensors are designed such that, during operation, they detect the oscillation of the measuring tube, wherein the first oscillation sensor forwards the oscillation to the control and evaluation unit as a first measuring signal, and wherein the second oscillation sensor forwards the oscillation to the control and evaluation unit as a second measuring signal, and wherein at least one comparison signal is determined using the first measuring signal and/or the second measuring signal.

Description of Related Art

It is known from the prior art to determine the mass flow rate of a medium flowing through a measuring tube according to the Coriolis principle. Known Coriolis mass flowmeters have, for this, at least one oscillation generator which brings the measuring tube to oscillation and at least two oscillation sensors, which detect the oscillation of the measuring tube on the inlet and outlet sides. If a medium flows through the measuring tube, Coriolis acceleration acts on the medium, which ultimately results in a phase difference between the inlet and outlet oscillation of the measuring tube. The mass flow can be determined from this phase difference.

It is advantageous when both the excitation frequency and the frequency, at which the phase difference between the input-side and the output-side signal is determined, correspond to the fundamental resonance frequency of the measuring tube in a movement mode. The measuring tube is often excited to oscillation in an excitation mode by the oscillation generator (central oscillation anti-node between inlet and outlet side nodes of the measuring tube), wherein the influence of the Coriolis force causes an overlapping oscillation of the measuring tube in the next higher oscillation mode of the measuring tube (additional central oscillation zero point of the measuring tube). These movements, of course, are superimposed on one another. In order to determine the phase difference or to evaluate the measured oscillation, the measured signal can, for example, be fed through a bandpass filter which is essentially permeable to the fundamental frequency of one of the excited oscillation modes, i.e., for example, for the excitation frequency or the fundamental resonance frequency of higher oscillation modes. In addition, the DC voltage component can also be determined and taken into account in the signal evaluation in order to detect, for example, insulation errors.

It is also known that disturbances and/or faulty states of the measuring device and/or of the measuring tube have an effect on the oscillation behavior of the measuring tube. As a result of the analysis of the oscillation behavior, existing disturbances can therefore be detected, for example due to deposition or corrosion of the measuring tube.

The German Patent Application DE 10 2008 059 920 A1 and corresponding U.S. Pat. No. 8,104,361 B2 disclose a method for identifying system-describing parameters, which can be carried out during closed-loop control. For this, a desired variable, for example, the phase between the excitation signal and the measurement signal, is varied. The variation selectively determines at least one parameter of the excited eigenform of the measuring tube, which shows an effect on the recorded measuring signal.

German Patent Application DE 10 2011 086 395 A1 and corresponding U.S. Pat. No. 8,950,274 B2 disclose a method for monitoring oscillation properties in a Coriolis mass flowmeter in order to detect, in particular, changes due to abrasion, corrosion or coating of the measuring tube. For this, an oscillation system is simulated by a digital model, which has at least one adjustable parameter. The signal for excitation of the oscillation has short-term signal modulations, wherein the effects of these short-term signal modulations on the oscillation system and on the digital model are detected. Additionally, it is determined whether the customizable parameter exceeds a limit value.

However, these methods described above have the disadvantage that disturbances that lead to non-linear changes in the oscillation behavior, i.e., for example, that cannot be detected or are not only detectable at the excitation frequency, are not detected or can only be detected with great complexity.

Such non-linear disturbances occur, for example, in the case of poor alignment of the oscillation generator and/or the oscillation sensors or when the oscillation generator and/or the oscillation sensors have been mechanically disengaged. In addition, such non-linear disturbances occur when the measuring tube geometry deviates from the desired geometry, for example, due to overheating or as a result of a fall.

SUMMARY OF THE INVENTION

Based on the prior art as described above, the object of the invention is to provide a method for operating a Coriolis mass flowmeter, with which, in particular, non-linear disturbances can be detected.

Another object of the present invention is to provide a corresponding Coriolis mass flowmeter.

According to a first teaching, the above-mentioned objects are achieved in that an expected value of the amplitude and/or the phase and/or at least a variable derived therefrom is determined at at least one evaluation frequency based on the excitation frequency $f_0$ and the excitation amplitude $A_0$, wherein the evaluation frequency corresponds to the excitation frequency $f_0$ and/or at least to a harmonic of the excitation frequency $f_0$, that the amplitude and/or the phase and/or the variable derived therefrom of the comparison measurement signal is detected exclusively at the evaluation frequency, that the expected value of the amplitude and/or the phase and/or the variable derived therefrom is compared to the corresponding value of the comparison measurement signal and a measure for the deviation is determined, and an alert is issued when the deviation of the expected value with the corresponding value of the comparison measurement signal exceeds an upper limit value or falls below a lower limit value.

According to the invention, the circumstance is used that non-linear disturbances of a harmonic, excited linear system lead to non-linear reaction signals, that is, they have no effect on the amplitude and/or the phase of the oscillation measured in the linear case; they produce further signal components, such as, for example, a higher noise or signals with other frequencies in the comparison measurement signal. The method according to the invention is based on a comparison of the expected values of the relevant variables with the actually-measured values of the corresponding variables. Preferably, the above-mentioned relevant variables are those variables by which a non-linearity of the comparison measurement signal can be made measurable.

Particularly preferably, the comparison measurement signal is measured not only in the range of the excitation frequency $f_0$, but is also tested for the presence of further frequency components in the range of the harmonic of the excitation frequency $f_0$. This implementation is distinguished from the similar, but very complex solution of analysis of the comparison measurement signal by means of a Fourier analysis in that an analysis of the comparison measurement signal is carried out exclusively in well-defined frequency ranges, namely in the range around the excitation frequency $f_0$ and in the range around the harmonic of the excitation frequency $f_0$. This analysis at defined frequency ranges, in contrast to a Fourier analysis, is particularly simple, wherein a high resolution can simultaneously be ensured.

The evaluation of the comparison measurement signal in the range of the excitation frequency $f_0$ and/or in the range of the harmonic can be carried out, for example, by filtering the comparison measurement signal with a bandpass filter which is essentially permeable for the excitation frequency $f_0$ or for the frequency of the harmonic of interest.

The term "in the range" is understood to be a frequency range which extends up to ±10% or ±5% or ±1% of the evaluation frequency by the evaluation frequency. To this extent, this statement takes into account the fact that signal-processing methods, such as, for example, the filtering of the comparison measurement signal with a band-pass filter, always involve technical inaccuracies which lead to a certain blurring of the frequency to be filtered.

As a result, the state of the measuring system, i.e., the state of the Coriolis mass flowmeter, can be monitored particularly easily by the method according to the invention and disturbances can be detected particularly simply.

The excitation frequency $f_0$ corresponds, according to a particularly preferred implementation of the method, to a resonance frequency of the measuring tube.

The expected value of the amplitude and/or the phase and/or the variable derived therefrom can be newly determined with each measurement or can be set before a measurement step, for example, in the scope of a calibration, or can be set during start-up of the Coriolis mass flowmeter.

According to a particularly preferred implementation, the at least one variable derived from the amplitude is the power and/or a value for the harmonic distortion (THD value) and/or a value for the harmonic distortion including noise (THD+N value) and/or the distortion factor and/or the signal-to-noise ratio (SNR).

The THD value is a measure of the harmonic distortion of the comparison measurement signal. The THD value is defined as the ratio of the summed powers $P_h$ of the harmonics to the power $P_0$ at the excitation frequency $f_0$:

$$THD_\% = P_h/P_0 \cdot 100.$$

In order to determine the THD value, therefore, the signal powers are determined both at the excitation frequency $f_0$ and at at least one harmonic of the excitation frequency $f_0$ and are then related to one another according to the above relationship. Subsequently, the expected value of the THD value and the THD value of the comparison measurement signal are related to one another to determine the deviation of the THD values.

In the determination of the THD+N value, the sum of the disturbance powers $P_{stör}$, i.e. the disturbance power at at least one harmonic $P_h$ and the disturbance power of the noise $P_{rausch}$, is compared with the total power of the comparison measurement signal $P_{ges}$:

$$THD+N_\% = P_{stör}/P_{ges} \cdot 100 = (P_h + P_{rausch})/P_{ges} \cdot 100.$$

Alternatively, the ratio of the power $P_0$ to the total power of the comparison measurement signal $P_{ges}$ can also be formed.

Alternatively, instead of the power ratios, the amplitude ratios can also be related to one another in accordance with the previously described relationships and referred to as THD values.

The distortion factor is also a measure of the non-linear distortion of a harmonic signal. In detail, the distortion factor indicates the proportion of the harmonic in the total signal. The distortion factor thereby refers to the effective values of the amplitudes.

According to a further advantageous implementation of the method according to the invention, the comparison measurement signal is the first measuring signal or the second measuring signal or a sum signal of the first measuring signal and the second measuring signal, or a difference signal of the first and second measuring signals, or is another functional relationship between the first and the second measuring signals. It is also conceivable, for example, to form a quotient of the first and the second measuring signal.

Furthermore, according to a further implementation, it is also advantageous when the Coriolis mass flowmeter has more than two oscillation sensors, i.e., three or four or five oscillation sensors, which are arranged on a measuring tube and which forward the oscillation as a third or a fourth or a fifth measuring signal to the control and the evaluation unit, and when the comparison signal is determined from the first and/or the second and/or the third and/or the fourth and/or the fifth measuring signal.

In addition, it is also advantageous when the Coriolis mass flowmeter has at least two measuring tubes, at least two oscillation generators and at least four oscillation sensors, wherein one oscillation generator and two oscillation sensors are arranged on a measuring tube and, during operation, the respective measuring tube is brought into a harmonic oscillation with the excitation frequency $f_0$ and the excitation amplitude $A_0$, wherein the first and the second oscillation sensors detect the oscillation of the measuring tube assigned to the oscillation sensors, wherein the first oscillation sensor forwards the oscillation as a first measuring signal to the control and evaluation unit, and wherein the second oscillation sensor forwards the oscillation as a second measuring signal to the control and evaluation unit, wherein the third oscillation sensor forwards the oscillation of the measuring tube as a third measurement signal to the control and evaluation unit, wherein the fourth oscillation sensor forwards the oscillation of the measuring tube as a fourth measurement signal to the control and evaluation unit, wherein the first measuring signal and/or the second measuring signal and/or the third measuring signal and/or the fourth measuring signal is/are used to determine at least one comparison measurement signal, and this comparison signal is compared to the expected signal corresponding to the method according to the invention.

According to a further implementation, it is also advantageous when more than one expected value of the amplitude and/or the phase and/or the variable derived therefrom is or are determined, and that the expected values of the amplitude and/or the phase and/or the variable derived therefrom, are compared simultaneously or chronologically successively to the corresponding values of the comparison measurement signal.

It is further advantageous when at least one additional expected value of the amplitude and/or the phase and/or the variable derived therefrom is determined at an evaluation frequency; which lies in a frequency interval around the excitation frequency $f_0$, wherein the frequency interval ranges to around ±20 to 50% of the excitation frequency around the excitation frequency $f_0$; and/or at an evaluation frequency, which lies in a frequency interval around the harmonic of the excitation frequency $f_0$, wherein the frequency interval ranges to around ±20 to 50% of the frequency of the harmonic around the frequency of the harmonic; and that the amplitude and/or the phase and/or the variable derived therefrom of the comparison measurement signal is detected at the evaluation frequency and to with the corresponding expected signal. This implementation has the advantage that not only noise components can be detected in the range of the excitation frequency and in the range of the harmonic of the excitation frequency, but also disturbance components which have frequencies which are close to the excitation frequency and/or the harmonic, wherein, at the same time, the simplicity of the method, i.e., the absence of a complete Fourier transformation of the comparison measurement signal, is retained.

According to a further advantageous implementation, the determination of the expected value of the amplitude and/or the phase and/or the variable derived therefrom and the comparison to the corresponding values of the comparison measurement signal occur periodically or are manually triggered. Periodic monitoring can reliably detect changes occurring over time, such as, for example, a mechanical disengagement of the oscillation sensors or a misalignment of the oscillation generator and/or the oscillation sensors. Alternatively, the method according to the invention can also be triggered manually on suspicion.

If the Coriolis mass flowmeter according to a further implementation has a display unit, it is particularly advantageous when the alert, in the event that the deviation between the expected value and the corresponding value of the comparison measurement signal exceeds an upper limit value or falls below a lower limit value, is issued on the display unit. Then the alert is directly perceptible to the user and the user can take appropriate measures to remedy the cause.

In addition, it is advantageous when a plurality of disturbance signals are stored in the control and evaluation unit with values for the amplitude and/or the phase and/or the frequency and/or at least a variable derived therefrom, wherein the individual disturbance signals are each preferably assigned a cause. According to a further implementation of the method, the amplitude and or the phase and/or the variable derived therefrom are compared to the values of the disturbance signals and when the amplitude and/or the phase and/or the variable of the comparison measurement signal derived therefrom conform essentially to the corresponding values of the disturbance signals, a second alert is issued in which a possible cause of the disturbance is indicated.

This implementation is particularly advantageous in that, in addition to the information that a disturbance is present, the user is also informed of the possible cause of the disturbance.

In this case, the storage of the disturbance signals can cause comparison measurement signals having a disturbance—i.e., in which the deviation of the expected value and the corresponding value of the comparison measurement signal exceeds an upper limit value or falls below a lower limit value, wherein the cause of the disturbance can be identified by the user—to be stored together with the cause in the control and evaluation unit.

According to a second teaching of the present invention, the object described above is achieved by a Coriolis mass flowmeter as described in the outset in that the control and evaluation unit is designed such that an expected value of the amplitude and/or the phase and/or at least one variable derived therefrom is determined at at least one evaluation frequency based on the excitation frequency $f_0$ and the excitation amplitude $A_0$, wherein the evaluation frequency corresponds to the excitation frequency $f_0$ and/or to at least one harmonic of the excitation frequency $f_0$, that the amplitude and/or the phase and/or the variable derived therefrom of the comparison measurement signal is detected exclusively at the evaluation frequency, that the expected value of the amplitude and/or the phase and/or the variable derived therefrom is compared to the corresponding value of the comparison measurement signal and a measure for the deviation is determined, and that an alert is issued when the deviation of the expected value with the corresponding value of the comparison measurement signal exceeds an upper limit value or falls below a lower limit value.

It is particularly preferred that the Coriolis mass flowmeter is designed such that it carries out one of the above-described methods during operation.

In detail, there is a plurality of possibilities for designing and further developing the method according to the invention and the Coriolis mass flowmeter according to the invention as will be apparent from the following description of preferred embodiments in conjunction with the accompanying drawings.

DETAILED DESCRIPTION OF THE INVENTION

Figure 1:
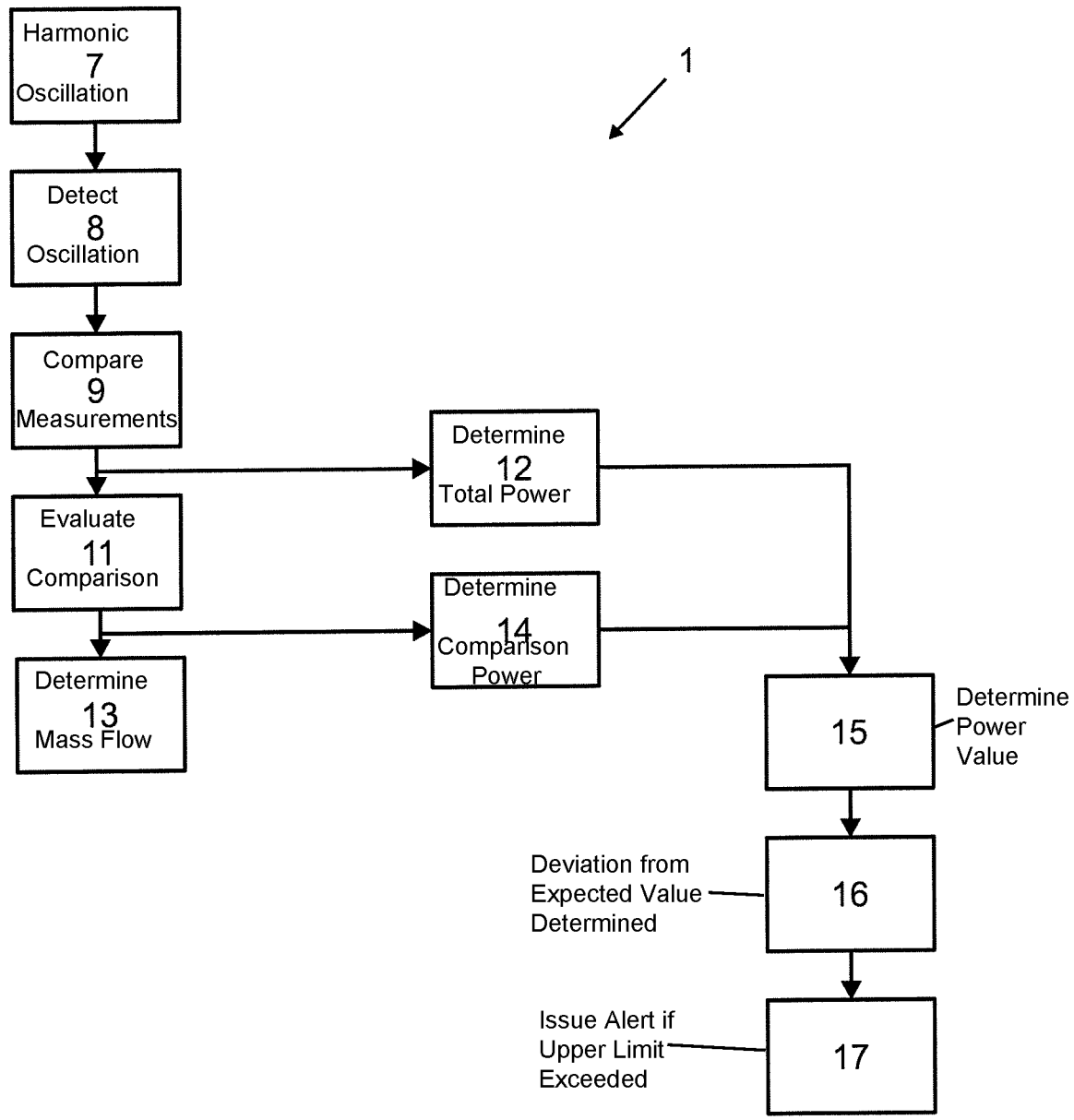
FIG. 1 is a flow chart for a first embodiment of a method according to the invention.
Figure 3:
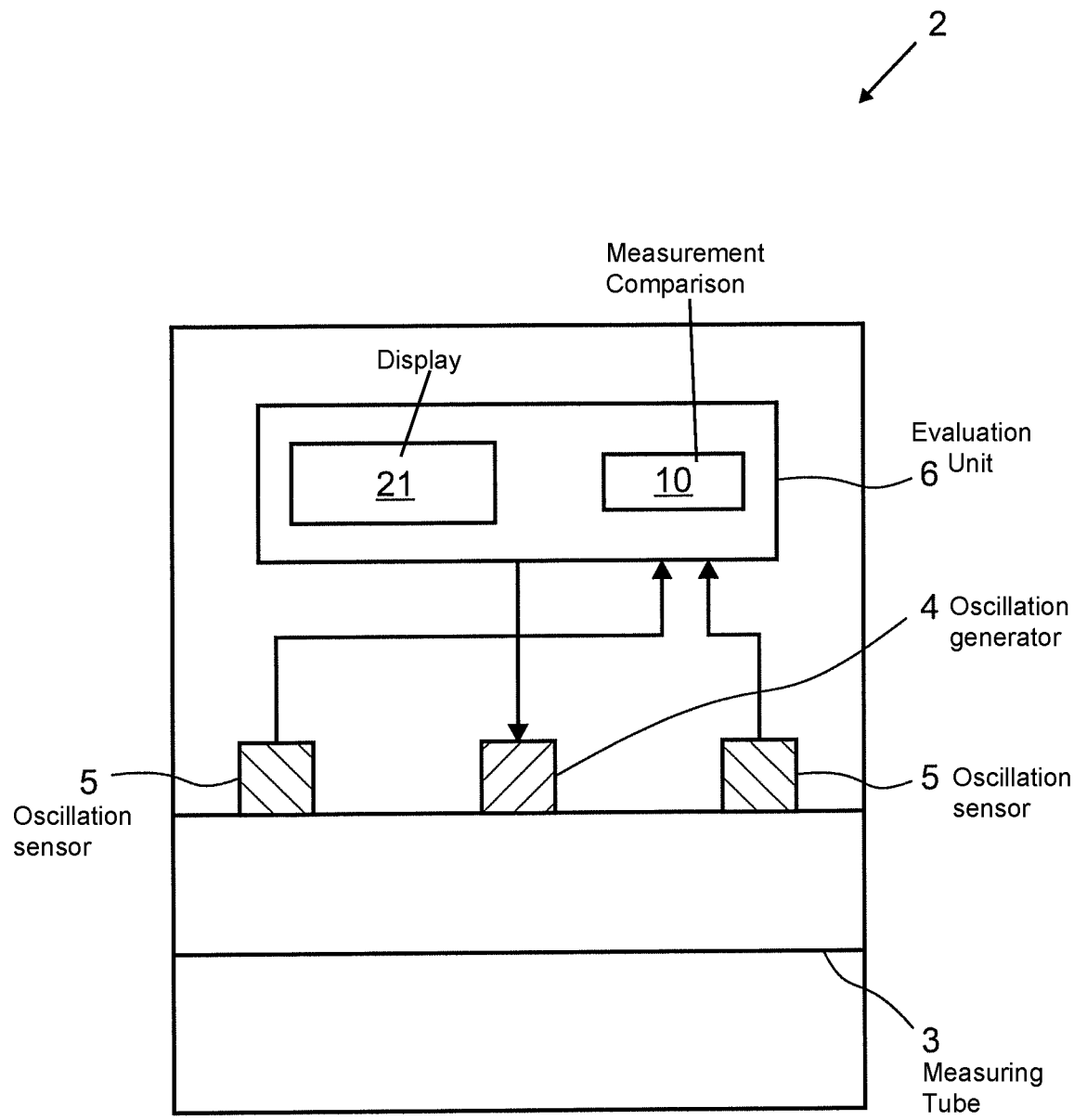

FIG. 1 shows a first embodiment of a method 1 for operating a Coriolis mass flowmeter 2, which is shown, for example, in FIG. 3. The Coriolis mass flowmeter 2 has at least one measuring tube 3, at least one oscillation generator 4, at least two oscillation sensors 5 and at least one control and evaluation unit 6, wherein the oscillation generator 4 and the oscillation sensors 5 are arranged on the measuring tube 3, wherein the measuring tube 3 has medium flowing through it.

In a first step 7 of the illustrated method 1, the oscillation generator 4 puts the measuring tube 3 into a harmonic oscillation with the excitation frequency $f_0$ and the excitation amplitude $A_0$. It should be noted that the measuring tube 3 oscillates during the entire method 1, and, in this respect, the excitation step 7 continues during the method 1.

In a next step 8, the first and second oscillation sensors 5 detect the oscillation of the measuring tube 3, and the first oscillation sensor 5 forwards the oscillation to the control and evaluation unit 6 as a first measuring signal, and the second oscillation sensor 5 forwards the oscillation to the control and evaluation unit 6 as a second measuring signal.

Comparison measurement signals 10 are then determined in a further step 9 from the first measuring signal and the second measuring signal. In the illustrated embodiment, the comparison measurement signals 10 correspond to the first measuring signal.

In a next step 11, the amplitude and the phase of the comparison measurement signal 10 are determined at the excitation frequency $f_0$. At the same time, the total power $P_{ges}$ of the comparison measurement signal 10 is determined 12.

The mass flow of the medium flowing through the measuring tube 3 is determined 13 from the measured amplitude and the phase as well as from comparison with the second measuring signal. In addition, the power $P_0$ of the comparison measurement signal 10 is determined from the amplitude at the excitation frequency $f_0$. The THD+N value of the comparison measurement signal 10 is determined in a next step 15 from the total power $P_{ges}$ and the power $P_0$ of the comparison measurement signal 10 at the excitation frequency $f_0$. The THD+N value is compared to a stored expected value, which has been determined earlier, in a next step 16, and the deviation between the THD+N value and the expected value is determined in step 16 by subtraction. If the deviation exceeds an upper limit value, an alert is issued in a next step 17.

Figure 2:
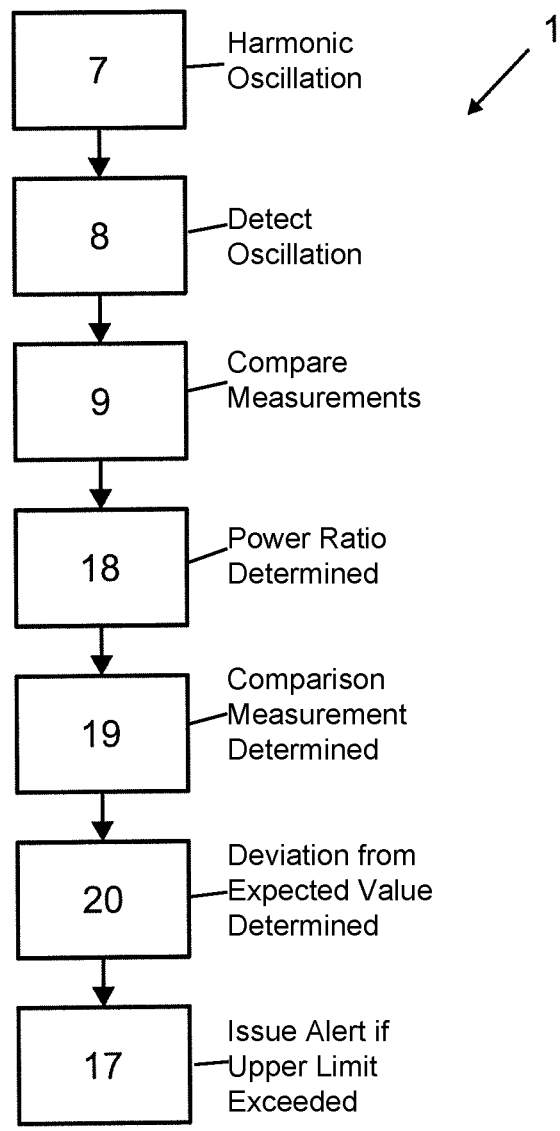
FIG. 2 is a flow chart for a second embodiment of a method according to the invention and FIG. 3 is a schematic representation of a first embodiment of a Coriolis mass flowmeter according to the invention.

FIG. 2 shows a second embodiment of a method 1 for operating a Coriolis mass flowmeter 2, as described, for example, above and illustrated in FIG. 3. First, the measuring tube 3 is excited in a first step 7 to harmonic oscillation with the excitation frequency $f_0$ and the amplitude $A_0$. The oscillation sensors 5 detect the oscillation and forward it in step 8 to the control and evaluation unit 6 as a first and a second measuring signal. Next, a comparison measurement signal 10 is determined 9, which corresponds to the first measuring signal in the illustrated embodiment.

Based on the excitation frequency $f_0$ and the amplitude $A_0$, an expected value for the THD value, i.e., the ratio of the powers $P_h$ to $P_0$, is determined 18.

In a subsequent step 19, the THD value of the comparison measurement signal 10 is determined. For this, the amplitude of the comparison measurement signal is determined at the excitation frequency $f_0$ and at the second and third harmonics, and the THD value is calculated therefrom.

In a next step 20, the THD value of the comparison measurement signal 10 is compared to the expected value of the THD value and a measure for the deviation is determined by subtraction.

In a next step 17, an alert is issued if the deviation exceeds an upper limit value.

As already described, FIG. 3 shows an embodiment of a Coriolis mass flowmeter 2. In addition to the components already described, the Coriolis mass flowmeter 2 has a display unit 21, via which the alert is issued in the event of an upper limit value being exceeded or a lower limit value being exceeded.

What is claimed is:

1. A method for determining occurrence of a condition affecting accuracy of measurements produced during operation of a Coriolis mass flowmeter that comprises at least one measuring tube, at least one oscillation generator, at least two oscillation sensors, and at least one control and evaluation unit, the oscillation generator and the oscillation sensors being arranged on the measuring tube, the method comprising:
   directing a flow of medium through the measuring tube,
   causing the oscillation generator to put the measuring tube into a harmonic oscillation with an excitation frequency $f_0$ and an excitation amplitude $A_0$,
   using the first and the second oscillation sensors to detect the oscillation of the measuring tube,
   forwarding oscillation detected by the first oscillation sensor to the control and evaluation unit as a first measuring signal,
   forwarding oscillation detected by the second oscillation sensor to the control and evaluation unit as a second measuring signal,
   determining at least one comparison measurement signal from at least one of the first measuring signal and the second measuring signal,
   determining mass flow of the medium flowing through the measuring tube from the amplitude and phase of the oscillation detected by the first and the second oscillation sensors,
   using the excitation frequency $f_0$ and the excitation amplitude $A_0$ to calculate an expected value of at least one of the amplitude, phase and a variable derived therefrom at at least one evaluation frequency,
   wherein the evaluation frequency corresponds to the excitation frequency $f_0$ and/or a harmonic of the excitation frequency $f_0$,
   determining at least one of the amplitude, the phase and the variable derived therefrom of the comparison measurement signal exclusively at the evaluation frequency,
   comparing the expected value of the at least one of the amplitude, the phase and the variable derived therefrom to a corresponding value of the comparison measurement signal and determining a measure for a deviation of the comparison measurement signal from the expected value,
   issuing an alert when the deviation of the expected value exceeds an upper limit value or falls below a lower limit value, and
   determining the existence of a mechanical problem with the flowmeter when an alert is issued.

2. The method according to claim 1, wherein the mechanical problem is one of mechanical disengagement of the oscillation sensors, misalignment of the oscillation generator and misalignment of at least one of the oscillation sensors.

3. The method according to claim 1, wherein the at least one variable derived from the amplitude is at least one of power, a value for harmonic distortion, a value for the harmonic distortion including noise, a distortion factor and a signal-to-noise ratio.

4. The method according to claim 1, wherein the comparison measurement signal is one of the first measuring signal, the second measuring signal, a sum signal of the first measuring signal and the second measuring signal, a difference signal of the first and second measuring signals, and a functional relationship between the first and the second measuring signals.

5. The method according to claim 1, wherein more than one said expected value of at least one of the amplitude, the phase and the variable derived therefrom is determined, and wherein the expected values are compared to the corresponding values of the comparison measurement signal.

6. The method according to claim 5, wherein the at least one additional expected value is determined at an evaluation frequency which lies in at least one of a frequency interval around ±20 to 50% of the excitation frequency around the excitation frequency $f_0$, and a frequency interval around the harmonic of the excitation frequency $f_0$, of ±20 to 50% of the frequency of the harmonic around the frequency of the harmonic; and wherein the at least one of the amplitude, the phase and a variable derived therefrom of the comparison measurement signal is detected at the evaluation frequency and compared to the corresponding expected value.

7. The method according to claim 1, wherein the determination of at least one of the expected value of the amplitude, the phase and the variable derived therefrom, and the comparison to the corresponding values of the comparison measurement signal are performed periodically.

8. A Coriolis mass flowmeter comprising:
at least one measuring tube,
at least one oscillation generator on the at least one measuring tube for producing a harmonic oscillation of the at least one measuring tube with an excitation frequency $f_0$ and an excitation amplitude $A_0$,
at least two oscillation sensors on the at least one measuring tube for detecting oscillation of the measuring tube, and
at least one control and evaluation unit,
wherein the first and the second oscillation sensors are connected to the at least one control and evaluation unit so as to forward the oscillation detected to the control and evaluation unit as first and second measuring signals, respectively, and wherein the at least one control and evaluation unit comprises:
means for producing at least one comparison measurement signal using at least one of the first measuring signal and the second measuring signal,
means for determining mass flow of a medium flowing through the at least one measuring tube from the amplitude and phase of the oscillation detected by the first and second oscillation sensors,
means for calculating an expected value of at least one of amplitude, phase and at least one variable derived therefrom using the excitation frequency $f_0$ and the excitation amplitude $A_0$ at at least one evaluation frequency,
means for determining the at least one of the amplitude and the phase and the variable derived therefrom of the comparison measurement signal exclusively at the evaluation frequency,
means for comparing the expected value to a corresponding value of the comparison measurement signal and for determining a measure of deviation of the comparison measurement signal from the expected value, and
means for issuing an alert when the deviation determined exceeds an upper limit value or falls below a lower limit value.

9. Coriolis mass flowmeter according to claim 8, wherein the alert represents the existence of a mechanical problem with the flowmeter.

10. Coriolis mass flowmeter according to claim 9, wherein mechanical problem is one of mechanical disengagement of the at least one of the oscillation sensors, misalignment of the oscillation generator and misalignment of at least one of the oscillation sensors.

\* \* \* \* \*